April 26, 1966  J. B. MONEY  3,248,029
NON-SPROCKETED MICROFILM STEPPING DEVICE
Filed Dec. 20, 1963
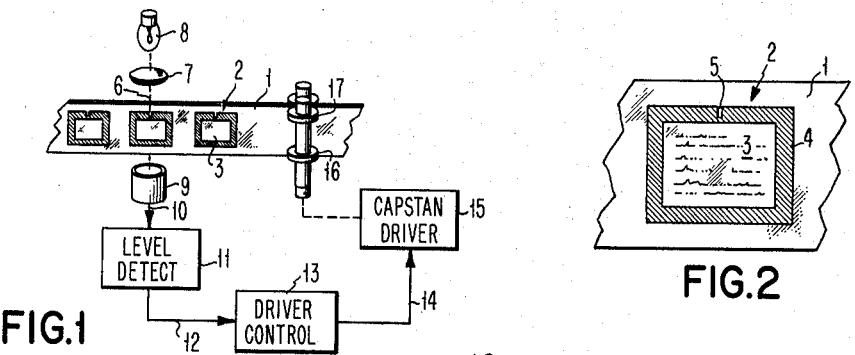
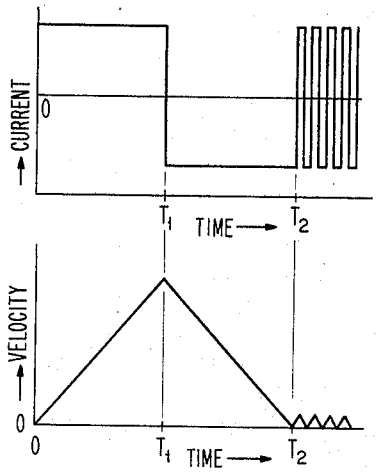
FIG.3
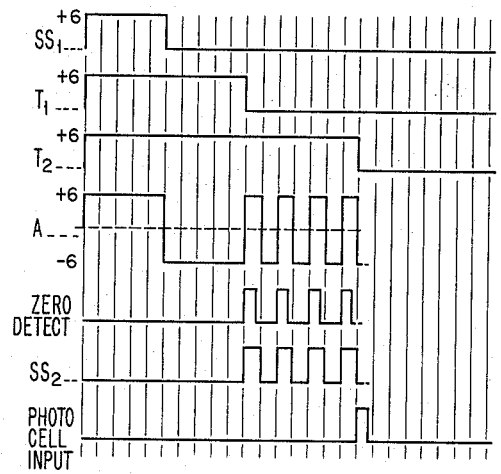
FIG.5
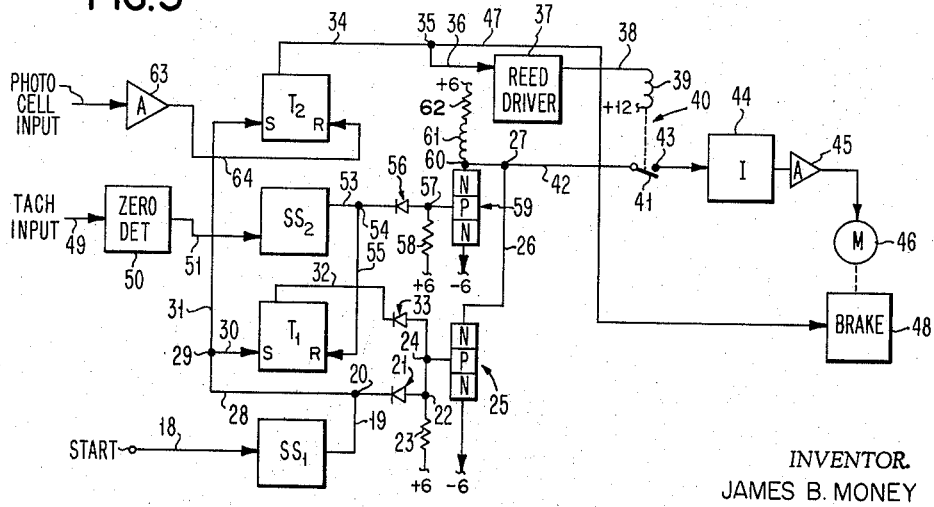
FIG.4
INVENTOR.
JAMES B. MONEY
BY John L Jackson
ATTORNEY

United States Patent Office 3,248,029
Patented Apr. 26, 1966

3,248,029
NON-SPROCKETED MICROFILM STEPPING
DEVICE
James B. Money, San Jose, Calif., assignor to International Business Machines Corporation, New York, N.Y., a corporation of New York
Filed Dec. 20, 1963, Ser. No. 332,145
4 Claims. (Cl. 226—29)

This invention relates to positioning systems in general and more particularly to a positioning system for stepping and registering on an optical axis frames of non-sprocketed microfilm.

More than one-half of presently existing microimage storage is in the non-sprocketed roll microfilm form. Traditionally, these rolls of microfilm, either sprocketed or non-sprocketed film, have been utilized in semi-automatic equipment in which accurate frame registration is not necessary. Thus, the output of the microfilm has been either a viewing screen or to some sort of hard copy output machine. Slight errors in positioning the microfilm in alignment with the optical axis of either the viewing screen or the hard copy output machine could be tolerated. Moreover, in the case of the viewing screen, means are normally provided for operator position adjustment.

With more and more visual information being stored in microimage form, a need has arisen for automatic image storage and retrieval systems. Obviously, the access time of a roll system would be quite large as compared to the access time of an automatic system wherein visual information is stored on discrete lengths of film such as chips or film strips which can be randomly accessed. This latter type of system is the one most often spoken of today as being the system of the future. Conversion of the vast quantities of existing roll microfilm information to discrete film chip storage systems is therefore necessary in many instances. Thus, highly accurate alignment of the frames of roll microfilm with a copying station is required not only for uniformity, but, additionally, to meet specifications such as those of government agencies which are the greatest users of roll microfilm systems today. While reproduction of images from roll microfilm onto discrete chips or film strips at a 1:1 ratio requires accurate registration, the problem of registration is compounded in those systems wherein the reproduction from the roll microfilm to the chip or film strip is made at large reductions.

Obviously, to accomplish conversion from roll microfilm to film strips, the process must be automated to as great an extent as possible. Thus, tedious operator alignment procedures, which are not conducive to an automatic process, are not available. A need therefore exists for an extremely accurate alignment system for aligning frames of non-sprocketed microfilm precisely with an optical axis which is completely automatic. Additionally, this alignment system should be rapid and capable of utilization with both sprocketed and non-sprocketed microfilm.

It is therefore an object of the present invention to provide a novel microfilm positioning system which is capable of positioning not only sprocketed microfilm, but non-sprocketed microfilm as well.

Another object of the present invention is to provide a system for positioning microfilm which is completely automatic.

Another object of the present invention is to provide a system for positioning microfilm which not only is accurate, but is capable of high rates.

Another object of the present invention is to provide a low cost, open loop, flip-flop servo microfilm positioning system.

Another object of the present invention is to provide a positioning mechanism which is servo controlled, but which never overshoots a desired position to an extent requiring reversal of capstan movement.

Other and further objects and advantages of the invention will be apparent from the following more particular description of the preferred embodiment of the invention as illustrated in the accompanying drawings in which:

FIG. 1 is a diagrammatic block view of the overall system;

FIG. 2 is a view illustrating the layout of a frame on a length of non-sprocketed microfilm;

FIG. 3 is an illustration of waveforms illustrating the linear movement with time of the microfilm to be positioned and current with time applied to the capstan driver to accomplish this movement.

FIG. 4 is a schematic block diagram of the system utilized to accomplish the bang-bang type operation of the subject system; and FIG. 5 shows waveforms associated with the schematic block diagram of FIG. 4 illustrating the operation and timing thereof.

Briefly, the capstan driving a length of non-sprocketed microfilm is, with a bang-bang like servo technique, driven one-half of approximately 95% of the distance toward a new frame position at full servo power and the power is then reversed for the other one-half such that the film driven by the capstan arrives, after a minimum amount of time, at zero velocity at a position corresponding to 95% of the movement towards the new film position. The film strip is then stepped in steps equal to the allowable position error toward the new position at which a light photocell arrangement senses the transparent mark of the new frame which causes power to be removed from the servo motor and a brake applied thereto.

Refer first to FIG. 1 wherein is shown a diagrammatic schematic of the overall microfilm positions system. In FIG. 1 is shown for illustrative purposes a length of non-sprocketed microfilm 1 having represented thereon a plurality of frames 2 each containing an image area 3. As better illustrated in FIG. 2, the format utilized by most government agencies is for illustrative purposes shown. As shown in FIG. 2, the image area 3 is surrounded by an opaque rim 4, a transparent slit 5 centered at the top. This transparent opening or slit 5 is, as obvious, greatly enlarged relative to the other parts of the frame for purposes of illustration and explanation.

Refer again to FIG. 1. The frames on the microfilm 1 are to be moved into alignment with an optical station, not shown, but which will have an optical axis passing through the center of the image area of the frame when the slit 5 is in alignment with the optical axis 6 of the lens 7, light source 8 and photocell 9. Additionally, as illustrated in FIG. 1, electrically connected along line 10 to the photocell 9 is a level detect 11 which provides a signal along line 12 to a driver control 13 when the output from the photocell exceeds a predetermined level. The driver control 13 is connected along line 14 to a capstan driver 15 which may, for instance, be a conventional servo motor. The driver 15 is mechanically connected by suitable means to capstans 16 and 17 which, in a usual manner, drive the length of non-sprocketed microfilm 1.

In the general operation of the system illustrated in FIG. 1, the driver 15 drives the selected frame on the length of microfilm 1 by means of capstans 16 and 17 into alignment with the optical axis of the optical station. When the driver 15, under control of the driver control 13, the controlling features of which will be more fully discussed hereinafter, causes the slit in the rim 4 of the selected frame to be positioned on the optical axis of the lens 7 and photocell arrangement 9, the photocell senses light from the light source 8, which is condensed by means of the lens 7. The photocell then emits a pulse along line 10 to the level detect 11 which, if the photocell output exceeds a predetermined level, in turn emits a signal along line 12 to the driver control 13 telling it that the desired frame 2 on the microfilm 1 is in alignment.

The herein described system is primarily for use in an application such as registering non-sprocketed microfilm wherein the distance between the frames of the microfilm is relatively fixed varying, for instance, only plus or minus 5% from frame to frame. An additional criterion is that some predetermined positional error must be acceptable. This second criterion is found to some extent in all systems since it is theoretically impossible to achieve exact registration. For purposes of illustration, however, the tolerances allowed by government agencies in positioning microimages will be utilized. The most common tolerance used today is .002 inch. With the criteria that the spacing of the frames on the microfilm is relatively uniform and that a certain allowable positional error is known, the system basically functions as follows. The tape is driven at maximum velocity for one-half of 95% of the distance to the next frame and the drive is reversed for the remaining one-half of 95% of the distance to the new frame position such that the frame arrives at 95% of the distance at substantially zero velocity. The frame is then stepped in steps of .002 of an inch for the remaining distance to the new position at which time a photocell light source arrangement senses the slit in the center of the rim of the frame and emits a signal which causes all power to be removed from the motor and brakes applied thereto.

Refer next to FIG. 3 which contains waveforms illustrative of the previously described operation. The basic drive mechanism may be considered an open loop system that uses tachometer output to switch the driving current to the servo motor between a positive and negative level (square wave). The output motion at the capstan will be discrete steps proportional in length to the period of the input current square wave. The upper waveform in FIG. 3 shows the typical current waveform for a one frame advancement of the film. The lower waveform in FIG. 3 is the corresponding velocity waveform. The total step is the area under each of the triangular waveforms with the first step so arranged to equal approximately 95% of the frame to frame spacing. After completion of the large step, a series of fine (.002 inch) steps commence until the center of the frame is positioned substantially on the optical axis of the system.

Considering the waveforms of FIG. 3, it can be seen that the servo motor is supplied with a positive current, $I_0$, for a predetremined length of time, i.e., to $t_1$. Because the time constant of the motor is long compared to the period of the current waveform the velocity profile is a positive going ramp increasing linearly with time. At $t_1$ the current switches to its negative value, $-I_0$. Corresponding to this negative current, the velocity is a negative going ramp approaching zero velocity. As will be hereinafter more fully explained, attached to the output of the tachometer is a zero detect circuit which, upon sensing zero velocity ($t_2$), switches the current back to $+I_0$.

The second phase of the motion is the fine stepping action. After sensing zero velocity ($t_2$) the current returns, as previously stated, to $+I_0$. The current stays positive for, for instance, one millisecond and then returns to $-I_0$. The velocity profile is again triangular shaped with its area equal to .002 inch displacement. Upon reaching zero velocity, current is again switched to $+I_0$. This cycle is repeated until the slit in the rim of the frame is sensed by the diode photocell arrangement as will be later more fully described.

Refer next to FIG. 4 which is a block schematic diagram of the system utilized to accomplish the heretofore described stepping action. In FIG. 4 an input line 18 is connected to a source of start pulses which may be, for instance, a controller or a manual pushbutton type arrangement. The input line 18 is connected to a single shot multivibrator $SS_1$ which has its output applied along line 19 to a junction 20. Junction 20 is connected to the cathode of a diode 21 the anode of which is connected to a junction 22. Junction 22 is connected both through a load resistor 23 to a source of positive potential and to junction 24. Junction 24 is connected to the base of the NPN transistor 25 which has its emitter connected to a source of negative potential and its collector connected along line 26 to junction 27.

Junction 20 is also connected along line 28 to junction 29 which in turn is connected along line 30 to the set terminal of a trigger $T_1$ and to the set terminal of a trigger $T_2$ by line 31. The output trigger $T_1$ is connected along a line 32 to the cathode of diode 33 the anode of which is connected to junction 24.

The output of trigger $T_2$ is connected along line 34 to junction 35 which is in turn connected along line 36 to a reed relay driver 37. The reed driver 37 is connected along line 38 to the winding 39 of reed relay 40. The armature 41 of the reed relay is connected along line 42 to junction 27 and is operable in its energized state to connect line 42 to fixed contact 43. Fixed contact 43 is connected through an inverter 44 to a servo amplifier 45 which furnishes drive power to motor 46.

A tachometer connected to the motor shaft (not shown) has its output taken along line 49 by a zero velocity detect 50 which has its output connected along line 51 to a single shot multivibrator labelled $SS_2$. The output of $SS_2$ is fed along line 53 to a junction 54. Junction 54 is connected along line 55 to the reset input terminal of trigger $T_1$ and to the cathode of diode 56 the anode of which is connected to junction 57. Junction 57 is connected through resistor 58 to a positive potential and to the collector of NPN transistor 59. The emitter of transistor 59 is connected to a negative potential and its collector is connected to junction 60. Junction 60 is connected through an inductor 61 and a resistor 62 to a source of positive potential. The photocell has its output furnished to the input of an amplifier 63 the output of which is fed along line 64 to the reset input of trigger $T_2$.

In operation, the start pulse is applied along line 18 to cause the single shot, $SS_1$, to trigger. The output line 19 from $SS_1$ rises to a positive level of, for instance, +6 v., as illustrated by the waveforms of FIG. 5. This positive potential is applied both to diode 21 and to the set side of trigger $T_1$. Trigger $T_1$, as shown by the waveform of FIG. 5, is thus set and its set output terminal rises to a positive potential of, for instance, +6 v. which is applied to diode 33. As is obvious to one skilled in the art, diodes 21 and 33 and resistor 23 constitute an AND gate. Since the potential applied to both of diodes 21 and 33 is positive, the potential appearing at junction 24 is positive such that the NPN transistor 25 is turned on. When transistor 25 turns on, its collector falls to approximately −6 v. which is applied along line 26 and 42 to the armature 41 of relay 40.

The positive potential from $SS_1$ is also applied along line 31 to the set input of trigger $T_2$ thereby setting the trigger as illustrated in the waveform of FIG. 5. The set terminal output potential appearing on line 34 is positive as illustrated in the waveforms of FIG. 5 and is applied both along line 36 to the reed driver 37 to cause it to ground line 38 and along line 47 to the brake 48. Thus, 12 v. is across the winding 39 of relay 40, thereby causing armature 41 to contact the fixed contact 43 applying the −6 v. potential thereon through the inverter 44 to cause a +6 v. potential to be applied to the input of the amplifier 45. The amplifier 45 then applies power to the motor 46. The positive potential from trigger T₂ also acts along line 47 to release the brake 48. Thus, the brake is released and the motor has applied thereto a current waveform substantially as shown in the upper waveform of FIG. 3 to drive the capstan and film in a predetermined direction.

As illustrated in the waveforms of FIG. 5, after a predetermined time which, as previously stated, is equal to one-half of the time required to move the film 95% of the distance to its new frame position, SS₁ turns off thus applying zero potential across diode 21. Since diode 21 is then forward biased while diode 33 is reversed biased, transistor 25 is turned off. Thus, +6 v. potential is applied to armature 41 through resistor 62, and inductor 61 along line 42, thereby causing motor 46, which is still connected to armature 41 through the inverter 44 and amplifier 45, to, in a bang-bang like manner, decelerate. A tachometer is connected to the output shaft of motor 46 and, as shown in FIG. 4, feeds its output to a zero velocity detect 50. When zero velocity occurs, the zero detect circuit 50 feeds a pulse along line 51, as illustrated in FIG. 5, to fire SS₂. As shown in FIG. 5, the output of SS₂ is a positive square wave pulse of a predetermined duration which passes along line 53 to reset trigger T₁. It also passes through diode 56 to turn transistor 59 on, thus applying −6 v. potential to contact 43 again reversing the motor. When single shot SS₂ falls, transistor 59 turns off thus allowing the potential on contact 43 to rise to +6 v., again reversing the motor. When the next zero velocity situation is detected, SS₂ is fired again and the sequence is repeated until the photocell furnishes an input to the photocell amplifier 63 which, along line 64, resets trigger T₂, thus, removing potential from the winding 39 of the reed relay 40 and removing potential from brake 48 thus causing the motor to both have potential removed from it and to be braked simultaneously.

In summary, the capstans 16 and 17 driving the length of non-sprocketed microfilm 1 are, with a bang-bang servo technique, accelerated for one-half of approximately 95% of the distance toward a new film position and the motor driving the capstans is then decelerated for the other one-half such that the film arrives after a minimum amount of time at a position corresponding to 95% of the movement towards the new frame position. The film strip 1 is then stepped with bang-bang like steps equal to the allowable position error toward the new position at which time a light 8-photocell 9 arrangement senses the transparent mark 5 of the new frame and removes power from the servomotor 46 and applies a brake 48.

It will be recognized by those skilled in the art that there has been herein provided a novel microfilm positioning system which is capable of positioning not only non-sprocketed microfilm, but is capable of positioning sprocketed microfilm, the less difficult case, as well. Additionally, the herein provided system is completely automatic and is capable of accurate positioning while maintaining high throughput rates due to utilization of bang-bang type techniques. Moreover, the system is relatively simple using standard flip-flop type components and is moreover open loop and relatively inexpensive thus being conducive to mass production techniques.

While the invention has been particularly shown and described with reference to a preferred embodiment thereof, it will be understood by those skilled in the art that the foregoing and other changes in the form and details may be made therein without departing from the spirit and scope of the invention.

What is claimed is:

1. In a positioning mechanism wherein a member is to be driven repeatedly from an old position to a new position which positions are substantially equidistant, and wherein the member at each new position is to be indexed relative to a reference station within an allowable position error, a drive mechanism comprising:

means for driving said member through one cycle for substantially the entire distance to said new position, means for driving said member the remainder of the distance to said new position in steps equal to the allowable positional error, and opto-electronic means for applying a signal to said driving means upon the arrival of said member at said new position.

2. A system for positioning frames on a length of microfilm in alignment with an optical axis wherein said frames each have a centering indicia, said system comprising:

drive means for driving said film, control means for controlling said drive means to cause said microfilm to be repeatedly driven from an old frame position to a new frame position through one cycle for substantially the entire distance to the new frame position and to be driven the remainder of the distance in relatively small steps, and opto-electronic means in optical association with the centering indicia of a frame when said frame is positioned in alignment with said optical axis operative thereupon to feed a signal to said control means.

3. In a positioning mechanism wherein film having substantially uniformly spaced frames, each having a centering indicia, is driven such that frames are sequentially positioned in alignment with an optical axis within an allowable position error, a drive mechanism comprising:

drive means for driving said film, control means for controlling said drive means to cause the film to be driven through one cycle for substantially the entire distance to a new frame position and the remainder of the distance to said new frame position in steps equal to the allowable position error, and opto-electronic means in optical association with the centering indicia of a frame when said frame is positioned in alignment with said optical axis operative thereupon to feed a signal to said control means.

4. In a positioning mechanism wherein film having substantially uniformly spaced frames, each having a centering indicia, is driven such that frames are sequentially positioned in alignment with an optical axis within an allowable position error, a drive mechanism comprising:

drive means for driving said film, control means for controlling said drive means to cause the film to be driven through one cycle for substantially the entire distance to a new frame position and the remainder of the distance to said new frame in steps equal to the allowable position error, and opto-electronic means in optical association with the centering indicia of a frame when said frame is positioned in alignment with said optical axis operative thereupon to feed a signal to said control means.

References Cited by the Examiner

UNITED STATES PATENTS

| | | |
|---|---|---|
| 2,534,731 | 12/1950 | Perillo. |
| 2,729,447 | 1/1956 | Groll _____ 226—33 |
| 2,783,454 | 2/1957 | North _____ 340—149 |
| 2,923,921 | 2/1960 | Shapin. |
| 3,045,884 | 7/1962 | Buhrendorf _____ 226—50 |

M. HENSON WOOD, Jr., *Primary Examiner.*

ROBERT B. REEVES, *Examiner.*